W. E. DEAN.
TUNNELING MACHINE.
APPLICATION FILED OCT. 5, 1917.
Reissued Apr. 2, 1918.
14,454.
2 SHEETS—SHEET 1.
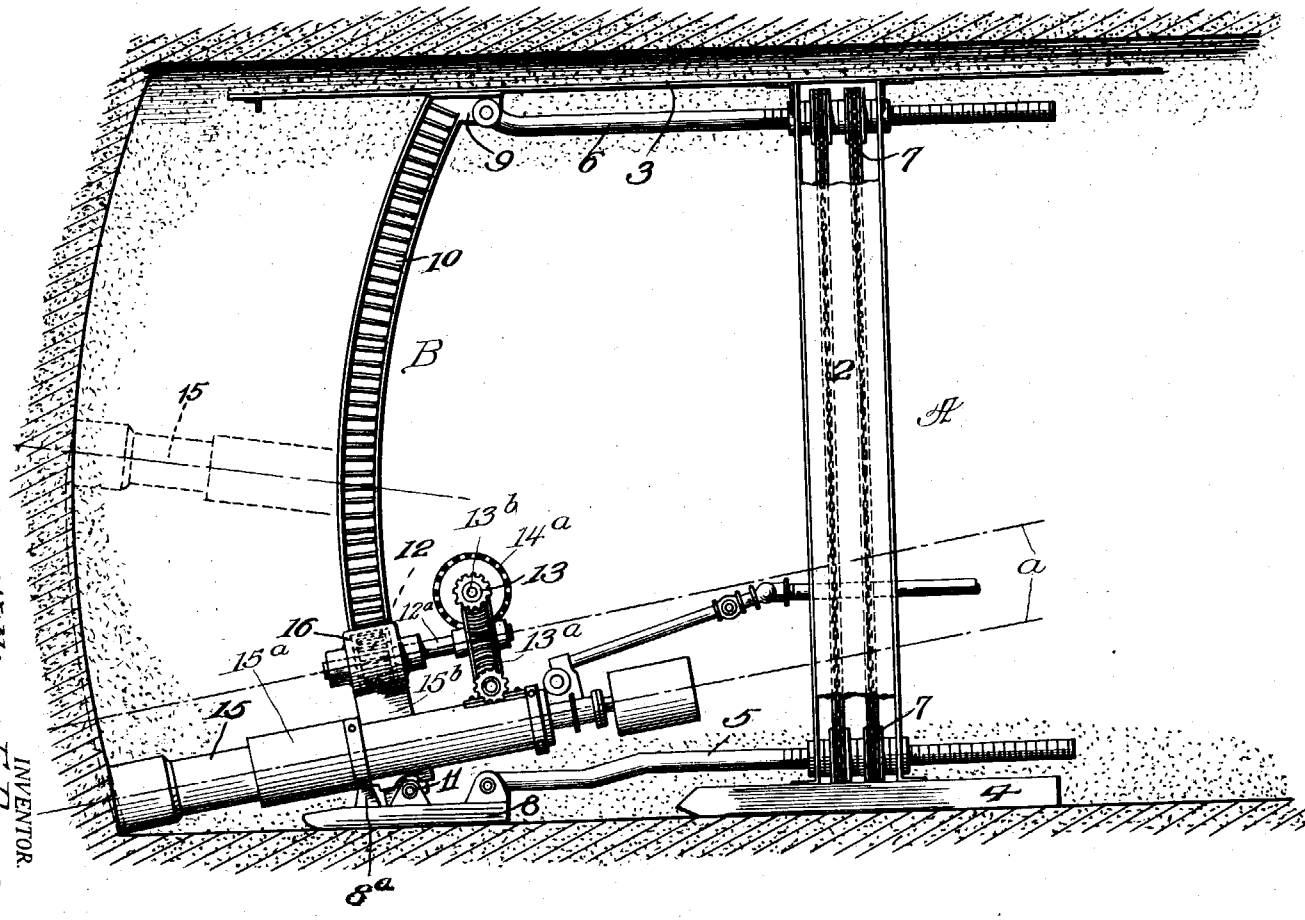
INVENTOR.
William E. Dean.
By Miller, Cherdahl & Parker,
ATTORNEYS.

W. E. DEAN.
TUNNELING MACHINE.
Reissued Apr. 2, 1918. APPLICATION FILED OCT. 5, 1917. 14,454.
2 SHEETS—SHEET 2.
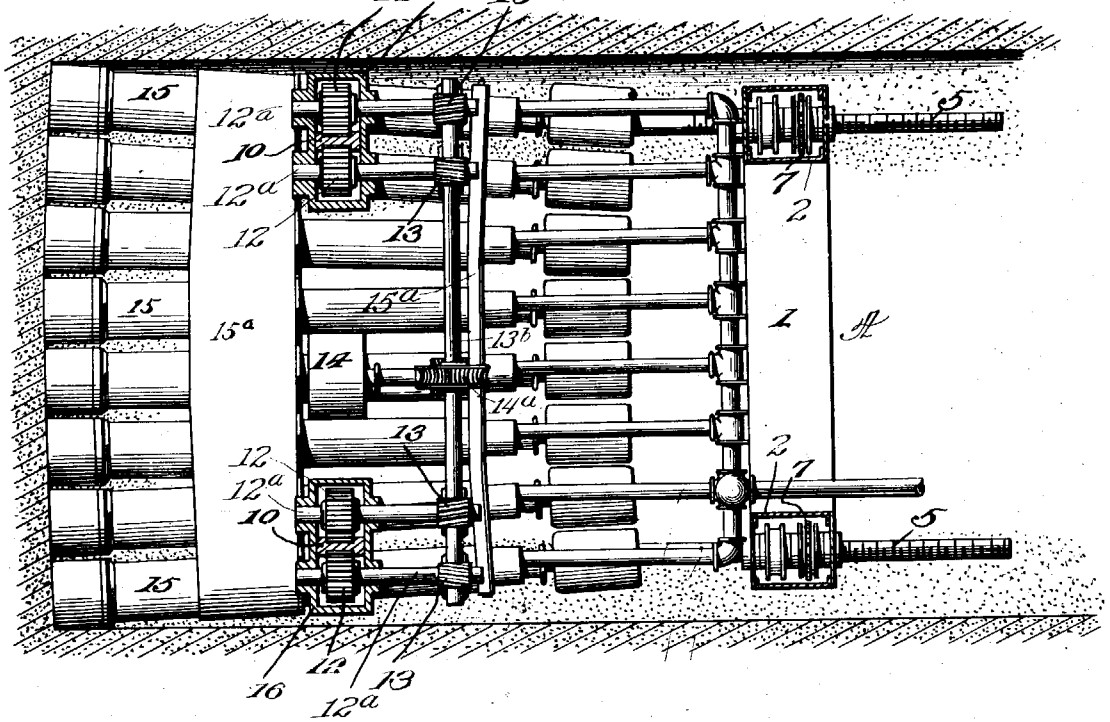
INVENTOR.
William E. Dean.
By Miller, Christabel & Parker
ATTORNEYS.

UNITED STATES PATENT OFFICE.

WILLIAM E. DEAN, OF SUPERIOR, WISCONSIN, ASSIGNOR TO DEAN TUNNEL MACHINE COMPANY, OF SUPERIOR, WISCONSIN, A CORPORATION.

TUNNELING-MACHINE.

14,454. Specification of Reissued Letters Patent. Reissued Apr. 2, 1918.

Original No. 1,156,277, dated October 12, 1915, Serial No. 720,077, filed September 12, 1912. Application for reissue filed October 5, 1917. Serial No. 194,982.

*To all whom it may concern:*

Be it known that I, WILLIAM E. DEAN, a citizen of the United States, residing at Superior, in the county of Douglas and State of Wisconsin, have invented certain new and useful Improvements in Tunneling-Machines, of which the following is a specification, reference being had therein to the accompanying drawing.

One of the objects of this invention is so to arrange the devices which operate upon the rock that said devices shall strike the rock squarely and with their entire faces.

Another object of the invention is to provide improved means for supporting and advancing said devices.

A further object is to provide a tunneling machine which is simple in construction and effective in operation and having certain details of structure hereinafter more fully set forth.

In the accompanying drawings, Figure 1 is a vertical longitudinal section of the end of a tunnel showing a side elevation of my improved tunneling machine; and Fig. 2 is a horizontal longitudinal section.

A strong rigid approximately rectangular main frame A is formed of preferably fabricated metal construction, comprising a base 1, vertical columns 2—2 and a top or roof 3, this frame being carried upon two suitably constructed skids or runners 4 which are designed to be movable longitudinally upon the floor of the tunnel.

Within the columns 2 and at the four corners of the supporting frame are carried arms, rods or shafts 5—5 and 6—6, the frame ends of the same being screw-threaded and susceptible of longitudinal movement independent of the frame but supported thereby, and for such longitudinal movement I prefer to employ internally-screw-threaded, chain-driven sprockets 7, which may be operated in any desired manner for the purpose, or the shafts 5—5 and 6—6 may be reciprocated in any other manner without departing from the spirit of my invention. Any suitable means may be employed to move the chains which drive the sprockets 7. It will be seen that the portions of the sprockets which engage the rods 5—5 and 6—6 constitute nuts.

The forward ends of the shafts 5—5 are pivotally supported by skids 8 designed to move back and forth upon the floor of the tunnel. The forward end of each of the shafts 6—6 is pivotally supported by a shoe 9 engaging the roof 3 of the supporting frame, said shoe being formed integral with a downwardly-extending segmental bar 10. The bars 10 are pivotally mounted upon the shoes 8 as illustrated in Fig. 1 at 11. The rods 5—5 and 6—6 and the bars 10 constitute a frame B which is movable with reference to the frame A. In operation the frame A is held from movement in any suitable way, so that the frame B may be intermittently pushed forward by operation of the sprockets 7. Each bar 10 has rack teeth upon two opposite sides.

The battery of drills 15 is carried by a rigid frame $15^a$ which is provided with two guides $15^b$ that are slidably mounted on the bars 10. The drill-carrying frame $15^a$ is moved up and down the bars 10 by means of pinions 12 meshing with the rack teeth upon the opposite sides of the bars 10. The pinions 12 are fixed upon shafts $12^a$ which are rotatably mounted in gear cases 16, said gear cases being rigid with the guides $15^b$. The shafts $12^a$ are preferably driven by worm gearing; in the present embodiment a worm wheel $13^a$ is fixed upon each shaft $12^a$, said worm wheel meshing with a worm 13 fixed on a shaft $13^b$. The shaft $13^b$ is driven from a suitable source of power such as a motor 14 through worm gearing $14^a$. It will be understood, however, that any other manner of drive may be employed for rotating the pinions 12 to raise and lower the battery of drills.

The drills, which are of the reciprocatory type, may be actuated by air, steam or electricity. They are all in one plane. As indicated in Fig. 2, the longitudinal axes of the drills converge toward a point in the rear of the machine. As shown by the broken lines *a* in Fig. 1, the plane containing the longitudinal axes of the drills is inclined to the plane of the shafts $12^a$, the inclination being in such direction that the entire faces of the drills strike the rock surface being operated upon.

Assuming the machine to be in the position shown in Fig. 1, the operation is as follows: Power having been communicated to the drills, the rods 5—5 and 6—6 are advanced the distance necessary to allow the entire faces of the drills to strike the rock. The battery is then slowly raised, the depth of the cut being determined by the angle or extent of divergence between the faces of the drills and the face of the tunnel. When the battery of drills has completed its upward movement, the reciprocation of the drills is stopped, the battery lowered until it stops against the members 8[a] on the skids 8, the drills again set in operation, the rods 5—5 and 6—6 advanced, and the battery again caused to swing upwardly. At proper intervals the debris resulting from the operation of the drills is removed.

When the rods 5—5 and 6—6 have been advanced as far as possible, the frame A is released to movement, the sprockets 7 are rotated in the reverse direction until the frame A has been moved toward the frame B the desired distance, and the frame A again fixed against movement.

The drills operate in regular succession, first one striking the rock and then the next, and so on from one side of the battery to the other. The drills are so close together that the entire face of the tunnel is operated upon.

As hereinbefore stated, the depth of the cut is determined by the angle or extent of divergence between the face of the drill and the face of the tunnel. This divergence is due to the fact that the drills are below and non-radial to the center of the rack bars 10. If the plane of the drills were parallel to the plane of the shafts 12[a] there would be some divergence between the faces of the drills and the face of the tunnel. The divergence may be increased by causing the plane of the drills and the plane of the shafts 12[a] to converge toward a point in front of the machine, as herein shown.

Having thus described my invention what I claim is:

1. A tunneling machine comprising a vertically-disposed support, horizontally-adjustable arms carried by the support, shoes carried by the outer ends of the arms, segmental rack bars pivotally connecting the shoes, a drill support surrounding the rack bars, a battery of drills carried by the drill support, pinions carried by the drill support and meshing with the rack bars, and means for rotating said pinions whereby the battery of drills may be moved in an arc of a circle.

2. A drilling machine comprising a vertically-disposed support, horizontally-arranged adjustable arms carried by the upper and lower ends of said support, shoes pivotally carried by the outer ends of said arms, segmental racks connecting the upper and lower shoes, a battery of drills carried by the support, pinions carried by the drill support and meshing with the rack bars, and means for rotating said pinions whereby the battery of drills may be moved in an arc of a circle.

3. A drilling machine comprising a vertically-disposed frame, horizontally-arranged rods extending through the said frame at its upper and lower ends, and screw-threaded sprockets on said rods within the frame, means for operating said sprockets whereby the rods are longitudinally adjustable, shoes carried by the outer ends of the rods, segmental rack bars connecting the upper and lower shoes, a drill support surrounding the rack bars, a battery of drills carried by the support, pinions carried by the support and meshing with the rack bars, and a worm driving said pinions whereby the battery of drills may be moved up and down in an arc of a circle.

4. A drilling machine comprising a vertically-disposed frame, horizontally-arranged rods extending through the frame at its upper and lower ends and threaded, sprockets on said threaded rods within the frame, means for moving the said sprockets in unison, shoes pivoted to and carried by the outer ends of the rods, rack bars rigidly carried by the upper shoes and having their lower ends pivotally connected to the lower shoes, a drill support surrounding the rack bars, a battery of drills carried by the support, pinions carried by the support and meshing with the rack bars, and a worm driving said pinions, whereby the battery of drills may be moved up and down in an arc of a circle.

5. A drilling machine comprising a vertically-disposed frame, horizontally-arranged rods extending through the frame at its upper and lower ends and threaded, sprockets on said threaded rods within the frame, means for moving the said sprockets in unison, shoes carried by the outer ends of the rods, rack bars rigidly carried by the upper shoes and having their lower ends pivotally connected to the lower shoes, a drill support surrounding the rack bars, a battery of drills carried by the support, pinions carried by the support and meshing with the rack bars, a worm for driving said pinions, and means for driving said worm substantially as shown and described.

6. A drilling machine comprising a frame, a skid for supporting said frame, horizontally-arranged rods carried by the upper and lower ends of the frame, screw-threaded sprockets on said rods within the frame, means for operating said sprockets in unison whereby the rods are simultaneously adjusted in either direction, a plate carried by the upper end of said frame, shoes carried by the outer ends of the upper rods and resting against the plate, shoes pivotally carried by the lower rods, segmental rack bars rigidly carried by the upper shoes and pivotally connected to the lower shoes, a drill support surrounding the segmental rack bars, a battery of drills carried by the support, pinions carried by the support and meshing with the segmental rack bars, a worm operating said pinions, and means operating the said worm, substantially as shown and described.

7. A tunneling machine comprising a vertically-disposed support, horizontally-adjustable arms carried by the support, segmental rack bars carried by the arms, a drill support surrounding the rack bars, a battery of drills carried by the drill support, pinions carried by the drill support and meshing with the rack bars, and means for rotating said pinions.

8. A drilling machine comprising a vertically-disposed support, horizontally-arranged adjustable arms carried by the upper and lower ends of said support, shoes pivotally carried by the outer ends of said arms, segmental racks connecting the upper and lower shoes, a drill support surrounding the racks, a battery of drills carried by the support at an angle to a radial line of the racks, pinions carried by the drills and meshing with the racks, and means for rotating said pinions whereby the battery of drills may be moved in an arc of a circle, substantially as shown and described.

9. A tunneling machine having, in combination, a vertically-disposed approximately rectangular main frame, screw-threaded rods extending forwardly from the four corners of the frame, nuts engaging said rods and rotatably mounted in the main frame, means for rotating the nuts, a battery of devices for operating upon rock, means connected to the forward ends of said rods for guiding and supporting said battery for movement from one wall of the tunnel to the opposite wall, and means for thus moving the battery.

10. A tunneling machine comprising a vertically-disposed frame, horizontally-adjustable arms carried by the frame, shoes carried by the outer ends of the arms, segmental rack bars pivotally connecting the shoes, a support surrounding the rack bars, a battery of devices carried by the support for operating upon the face of the tunnel, pinions carried by the support and meshing with the rack bars, and means for rotating said pinions whereby the battery of drills may be moved in an arc of a circle.

11. A tunneling machine having, in combination, a segmental rack bar, a support movable longitudinally of the rack bar, a pinion on the support and meshing with the rack bar, a device for operating upon rock, said device being carried by said support, the longitudinal axis of said device being non-radial to the center of the rack bar, and means for rotating said pinion and actuating said device.

12. A tunneling machine having, in combination, a main frame, a roof attached to the main frame, another frame located forwardly of the main frame and movably connected to the main frame, the second mentioned frame serving to support the forward portion of the roof, means on the main frame for moving said frames toward and away from each other, and means on the second mentioned frame for operating upon rock.

13. A drilling machine having, in combination, a main frame, a secondary frame located forward of the main frame and movably connected therewith, said secondary frame comprising two parallel segmental rack bars, a support movable longitudinally of the rack bars, pinions on the support and meshing with the rack bars, a plurality of independently actuated devices for operating upon rock, said devices being located in a single plane upon said support, and means for rotating said pinions to move said devices across the face of the tunnel.

14. A drilling machine having, in combination, a main frame, a secondary frame located forward of the main frame and movably connected therewith, said secondary frame comprising two parallel segmental rack bars, a support movable longitudinally of the rack bars, pinions on the support and meshing with the rack bars, a plurality of devices for operating upon rock, said devices being located upon said support, and means for rotating said pinions to move said devices across the face of the tunnel.

15. A tunneling machine having, in combination, a main frame, a secondary frame located forward of the main frame and movably connected therewith, said secondary frame comprising two parallel segmental rack bars, a support movable longitudinally of the rack bars, shafts rotatably mounted in said support, pinions on said shafts meshing with the rack bars, said shafts being radial to the center of the rack bars, a plurality of devices for operating upon rock, said devices being located upon said support, said devices being reciprocable longitudinally of their axes, the axes of said devices being at one side of said shafts and non-radial to the center of the rack bars, and means for rotating said shafts to move said devices across the face of the tunnel.

In testimony whereof, I have hereunto set my hand.

WILLIAM E. DEAN.

Copies of this patent may be obtained for five cents each, by addressing the "Commissioner of Patents, Washington, D. C."